Aug. 23, 1927.

W. K. EDWARDS 1,640,030

GRIP TESTER

Filed Nov. 26, 1926

Inventor:
William K. Edwards, by C. A. Mason Atty.

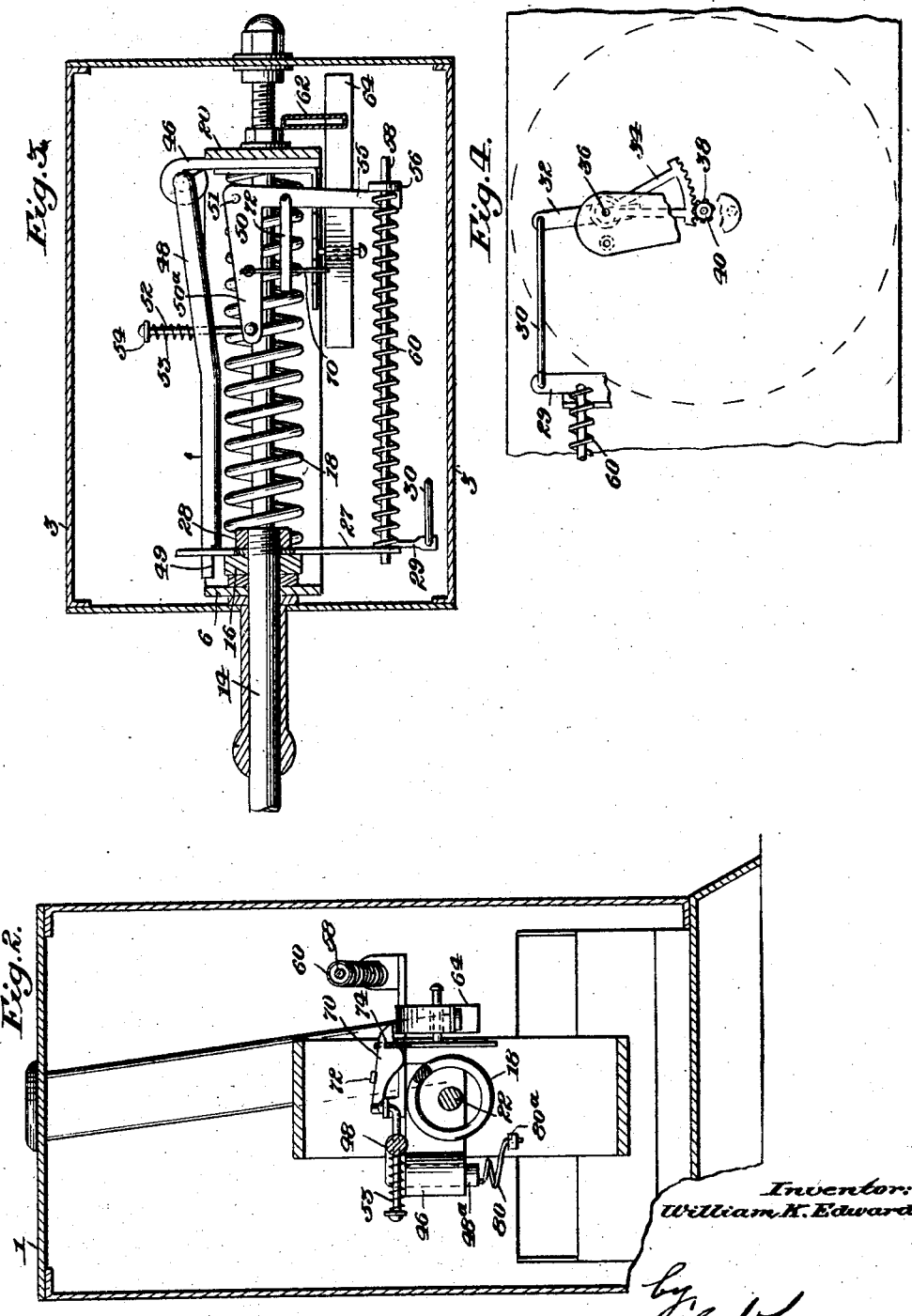

Patented Aug. 23, 1927.

1,640,030

UNITED STATES PATENT OFFICE.

WILLIAM K. EDWARDS, OF BIG SPRING, TEXAS.

GRIP TESTER.

Application filed November 26, 1926. Serial No. 150,928.

The invention relates to a machine for testing the muscular strength of the hand and arm and for registering in pounds the amount of force developed in the grip of any person. Preferably, and as herein shown, the machine is under the control of a coin, whereby it may be used in stores, or various places of amusement as a source of revenue.

In the accompanying drawings which illustrate a preferred embodiment of the invention:

Figure 2 is a sectional view on line 2—2, Figure 1;

Figure 3 is a sectional plan view on line 3—3, Figure 1;

Figure 4 is a sectional detail view on the line 4—4, Figure 1.

Figure 1:
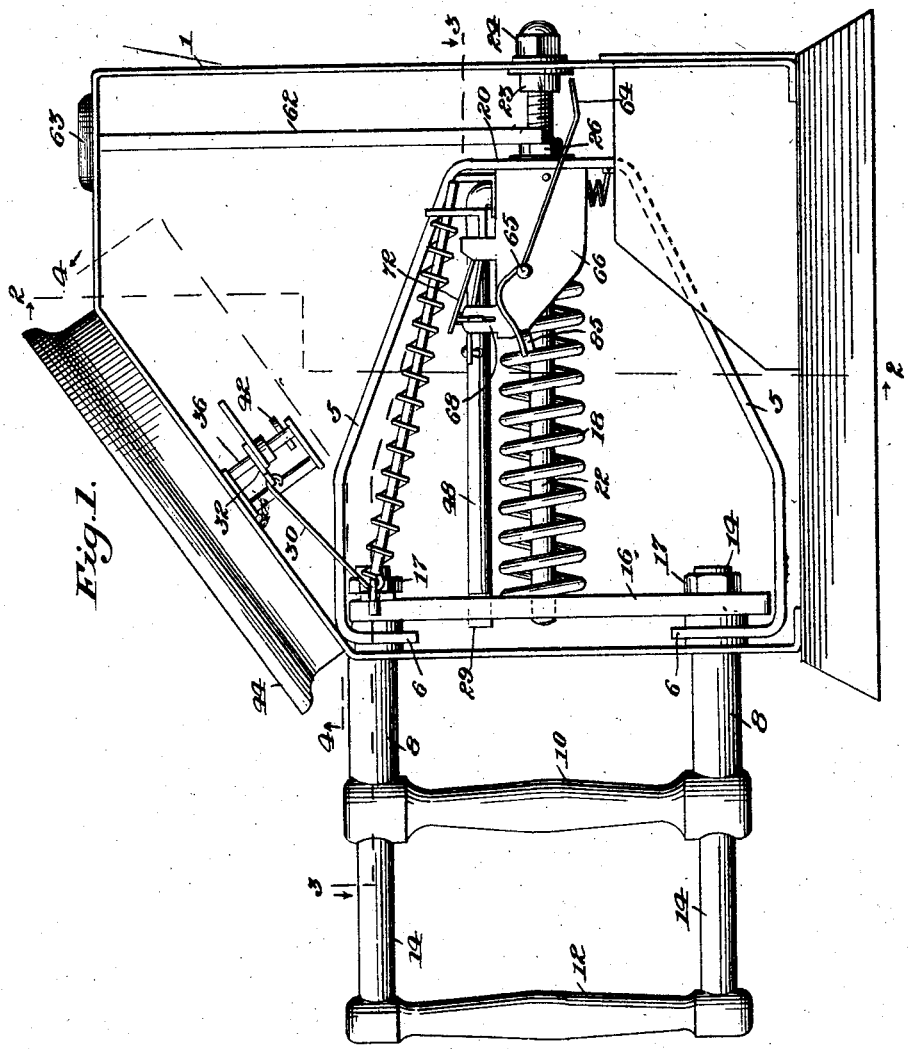
Figure 1 is a side elevation with one of the panels of the enclosing casing removed.

The machine is enclosed in a box or casing 1, preferably having removable sides 3—3. A metal frame 5, preferably composed of a strip of iron or the like is provided with two inwardly turned flanges 6, 6, which are supported upon two tubes 8 whose forward ends project through apertures in the front wall of the casing 1. The rear ends of the tubes 8 are joined by a bar 10 which is engaged by the fingers of the hand during the grip testing operation. A bar 12 located to the rear of the bar 10 carries parallel rods 14 which are received by and slide freely in the tubes 8, the rods 14 projecting beyond the ends of the tubes within the casing 1, and through a plate 16 of heavy material to which they are clamped by nuts 17.

A strong spiral spring 18 is confined between the plate 16 and the flat portion 20 of the frame 5, and a guiding and centering rod 22 passes through perforations in the portion 20 of the frame and plate 16, said rod being threaded at its outer end, and also passing through a perforation in the rear wall of the casing 1 to which it is clamped by nuts 23, 24, suitable washers being preferably interposed between said nuts and the vertical wall of the casing. The rod 22 is clamped against the portion 20 of the frame 5 by a nut 26 which is received upon the threaded rear end of said rod.

An arm 27 is provided with a perforation to receive the inner end of the upper rod 14 and a nut 28 has threaded connection with the extreme end of said rod and clamps the arm 27 against the plate 16. The outer end of the arm 27 carries an extension 29 which latter is perforated to receive the bent end of a rod 30. The opposite end of this rod is connected in the same manner with one arm of lever 32 which latter is connected with a segmental gear 34, both said lever and gear being mounted to turn upon a shaft 36. The gear 34 meshes with a pinion 38 which is fast to a shaft 40 whose outer end carries the usual pointer to move over a dial plate in the dial frame 44. The dial plate and pointer are not shown herein as the same are of common construction and of themselves form no part of the present invention.

With the parts as thus described, when the bars 10 and 12 are grasped by the hand of a person who desires to test his grip, and a gripping pressure is applied to force the bar 12 toward the bar 10 such pressure is resisted by the strong spring 18, and the strength exerted in the effort to force the bar 12 rearwardly will be met with increased resistance due to the compression of the spring. Movement of the bar 12 rearwardly will impart rotative movement to the pointer mounted on the shaft 40, through the connections afforded by the arm 27, extension 29, rod 30, lever 32, segment 34 and pinion 38. The extent of rotation of the pointer over the dial will register, as the pointer passes over the numerals on the dial, in pounds the gripping pressure applied to the bars 12, 10, when the dial is calibrated and the various parts are properly adjusted to the pressure-resistance of the spring 18. The description of the operation of the device thus far proceeds upon the theory that the same is free to operate at all times by movement of the plate 16 under the force imparted thereto by the handle 12, in its movement toward the rear portion 20 of the casing 5. The machine, however, is provided with a locking device which normally prevents its operation, except when said device is freed by the insertion of a coin.

A perforated bracket 46 is suitably clamped to the portion 20, and a locking bar 48 has its rear end 48ª bent at right angles and is received within the perforation of the bracket 46 so as to swing horizontally from said bracket. The forward end of the bar 48 is provided with a notch 49 adapted to engage with the plate 16 as shown in Figure 3, and thus prevent the plate from being forced rearwardly to compress the spring 18. A torsion spring 80 is connected at one terminal with the bent end 48ª of the bar 48 and has its other terminal anchored at 80ª to the portion 20 of the frame. Said spring exerts a normal tendency to swing the bar 48 outwardly to move the notched end 49 of the bar out of engagement with the plate 16.

A bell crank 50 is provided with a fulcrum shaft or stud 51 which is pivoted to brackets extending inwardly from the rear part 20 of the frame. One arm 50ª of said bell crank is pivotally connected with one end of a pin 52 which passes through an aperture in the bar 48, and a spiral spring 53 surrounds a part of the pin, and is confined between the bar 48 and a projecting portion or head 54 on the outer end of the pin. The other arm, 55, of the bell crank 50 carries a perforated lug 56 through which slides a rod 58, the other end of said rod being fastened to the arm 27, and a spiral spring 60 surrounds the rod 58 and is confined between said arm and the lug 56.

A coin chute 62 leads from a coin slot 63 at the top of the casing 1 downwardly within the casing, the discharge end of the chute being located immediately over one arm of a trigger 64 which is pivoted at 65 on a stud projecting from the face of a plate 66 extending rearwardly from the rear wall or portion 20 of the frame 5. This plate is provided with an upward extension 68 having a vertical slot therein (see Figure 1) and a latch 70 is supported for vertical pivotal movements on the arm 50ª of the bell crank 50. The forward end of said latch is received in the slot in the extension 68, and has a notch 74 to engage the edge of said extension at the bottom of the slot. A spring 72 is mounted upon the arm 55 of the bell crank and extends over the latch, said spring normally acting to press the latch downwardly in the slot of the extension 68 so as to hold the latch in locking engagement with said extension, thereby preventing rotation of the bell crank 50, and hence preventing outward movement of the locking bar 48 to permit rearward movement of the plate 16 and compression of the spring 18. As long as the latch 70 remains in locking engagement with the extension 68 the machine is locked against operation, but as soon as said latch is raised the spring 80 instantly acts to move the bar 48 and bell crank 50 outwardly, to disengage the notch 49 from the plate 16. This unlocking movement of the latch is effected when a coin of the proper denomination is introduced in the coin chute. the weight of said coin being sufficient to overbalance a weight 85, carried by the short arm of the trigger 64, which weight is sufficient to normally depress the short arm of the trigger and raise the other arm of the latter which extends beneath the coin chute. When a coin has thus been inserted in the machine to release the locking mechanism, the operator may test his grip by squeezing the two bars 10, 12, forcing the latter bar toward the former and compressing the spring 18 to that extent which his gripping capacity will permit, the force exerted being indicated in pounds by the pointer as it moves over the dial. As the plate 16 is forced to the rear the arm 27, rod 58, and spring 60, acting through the bell crank, rod 52 and spring 53 will swing the locking bar 48 on its pivot inwardly with a yielding pressure, and cause the notched end of said bar to bear against the edge of the plate 16, and at the same time the movement of the bell crank will carry the latch 70 in a forward direction through the slot of the extension 68 until the notch in said latch engages the lower edge of the slot. Upon release of the handle 12 the spring 18 will return the plate 16 to its forward position, thus permitting the shoulder of the notch 49 to engage the front face of the plate under the action of the spring 53. It will be understood that after the latch has been locked to the extension 68 the torsion spring 80 will be inoperative to swing the bar 48 outwardly and away from locking engagement with the plate 16.

From the foregoing it will be seen that the gripping mechanism is at all times locked against operative movement to test the grip, except immediately after a coin of the proper denomination has been introduced in the coin chute, and that after a test of the grip is made and the parts are returned to normal position the locking mechanism will be automatically effective to maintain them locked in such position until another coin has been inserted in the chute.

I claim as my invention:

1. In a muscular testing device of the character described, the combination of grip resisting means, handles for operating the same, a locking bar to normally prevent movement of one of said handles, a spring acting to remove said locking means, a bell crank and latch for holding said locking means in position to prevent operation of the device, and coin controlled means for operating said latch.

2. In a muscular testing device the combination of grip resisting means, a movable handle for operating said means, a locking bar to prevent movement of said handle, resilient means to rotate said bar out of locking engagement with a moving part of the machine, means including a bell crank and latch carried thereby for holding the locking means in position to prevent operation of the machine, and coin controlled means for tripping said latch.

3. A grip testing device comprising relatively movable handles, grip resisting means operated by movement of one of said handles, a rotating locking bar to prevent movement of said handle, means including the bell crank and latch carried thereby to prevent unlocking of said bar, a spring to effect such unlocking movement when permitted, coin controlled means for releasing said latch, and means for restoring the locking bar to position for engaging a movable part of the machine, said restoring means including a yielding element.

4. A grip testing machine comprising a movable handle, a spring arranged to be put under compression by movement of said handle, registering means actuating by movement of the handle, a plate interposed between said handle and spring, a pivoted locking bar arranged to engage said plate and prevent movement thereof, a bell crank having one arm connected by yielding means with said bar, a locking latch carried by said arm, coin controlled means for releasing said latch, a spring for rotating said bar to unlock the machine, and means for restoring said bar to locking position, said means including a yielding connection between said plate and an arm of the bell crank.

In testimony whereof I have hereunto set my hand this 22d day of November A. D. 1926.

WILLIAM K. EDWARDS.